July 27, 1965  I. C. COWIE  3,197,733
METAL DETECTOR FOR PNEUMATIC TIRES OF AUTOMOTIVE VEHICLES
Filed Oct. 23, 1962   2 Sheets-Sheet 1

INVENTOR.
IRA C. COWIE
BY *Shanley + O'neil*
ATTORNEY

July 27, 1965     I. C. COWIE     3,197,733
METAL DETECTOR FOR PNEUMATIC TIRES OF AUTOMOTIVE VEHICLES
Filed Oct. 23, 1962     2 Sheets-Sheet 2

INVENTOR.
IRA C. COWIE
BY Shanley & O'Neil
ATTORNEYS

United States Patent Office 3,197,733
Patented July 27, 1965

3,197,733
METAL DETECTOR FOR PNEUMATIC TIRES OF AUTOMOTIVE VEHICLES
Ira C. Cowie, Betty's Delight, Port Tobacco, Md.
Filed Oct. 23, 1962, Ser. No. 232,455
3 Claims. (Cl. 340—52)

The present invention relates to automotive vehicles having pneumatic tires, and more particularly to detectors for detecting the presence of metal in such tires.

In the past, detectors for this purpose have been proposed, comprising implements that are manually held close to the tread or face of a tire as the tire is rotated. The implement commonly includes a light that is actuated by the presence of a piece of metal in the tire face as that portion of the tire face passes the implement. Such implements were used in either of two ways: a driver could move the car slowly forward or backward while another person held the implement close to the tire face and noted any flashes of the light that would indicate the presence of a piece of metal in the tire; or such detectors could be operated by one person rather than two, if the car were jacked up and held stationary while the wheel was rotated and the implement held close to the tire face.

Obviously, either such method of use had serious drawbacks. The practice of one person moving the car slowly forward or backward while another person held a detector adjacent the tire face plainly involved the danger that the driver would lose control of the car and run over the observer. Also, the body and fender design on contemporary cars so masks the wheel faces that it is difficult to hold such a detector adjacent an exposed portion of the tire face and at the same time read the detector.

On the other hand, the practice of jacking up the car and manually rotating the wheels for metal detection is so laborious in terms of operating the automobile wheel jack that many if not most automobile owners might suffer the metal in preference to the exercise. Moreover, no matter which method of using the detection devices was employed, it was still impossible to use them except at the beginning or the end of a trip or on some other occasion when the car could be safely parked off the street for the required period of time.

Although a number of attempts were made to overcome these and other difficulties and disadvantages of the prior art devices for this purpose, none, as far as is known, was entirely successful when practiced commercially.

Accordingly, it is an object of the present invention to provide metal detectors for pneumatic tires of automotive vehicles which eliminate the labor of jacking up the car or the inconvenience and danger of working with another person.

Another object of the present invention is the provision of such metal detectors that can be used wherever and whenever desired, even when the vehicle is moving in traffic.

Finally, it is an object of the present invention to provide such metal detectors that will be relatively simple and inexpensive to manufacture, rapid and easy to operate, and rugged and durable in use.

Other objects and advantages of the present invention will become apparent from a consideration of the following description, taken in connection with the accompanying drawings, in which.

Figure 1:
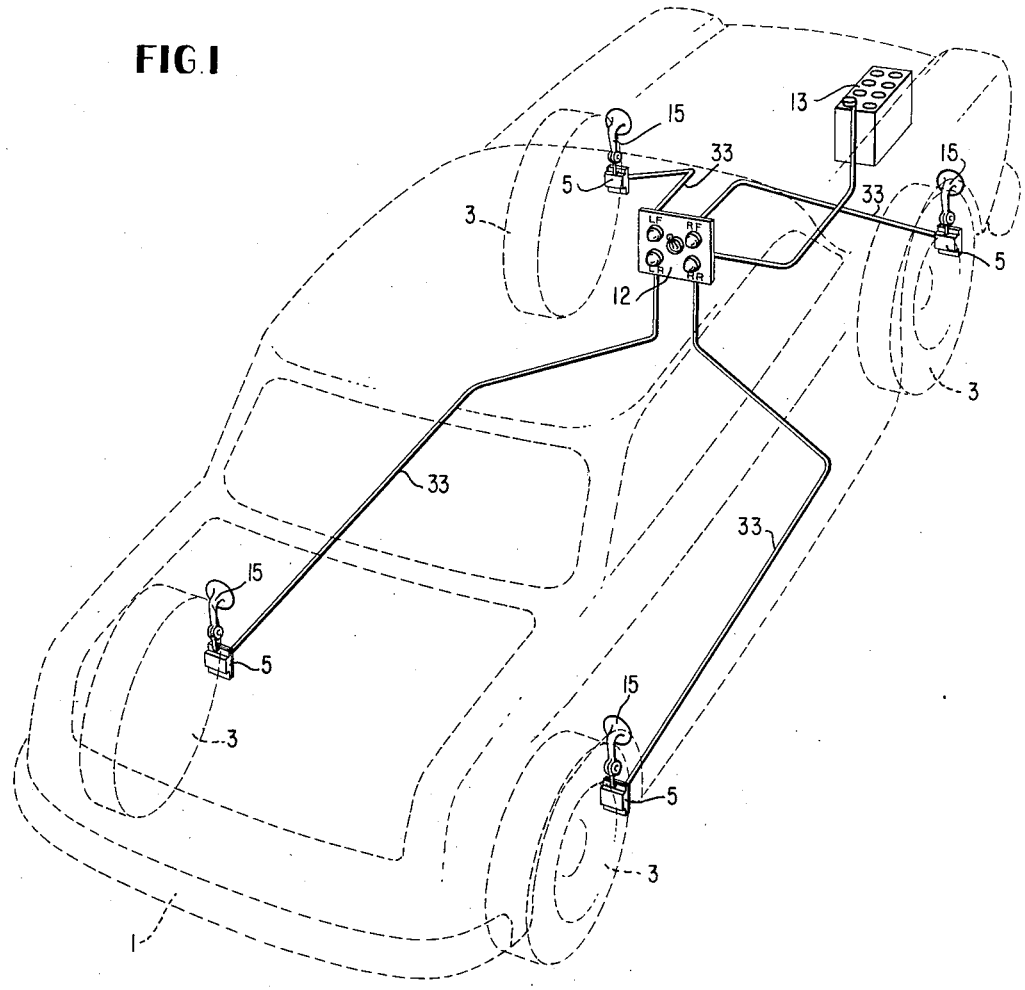
FIGURE 1 is a schematic view of a metal detector system according to the present invention applied to an automotive vehicle.
Figure 2:
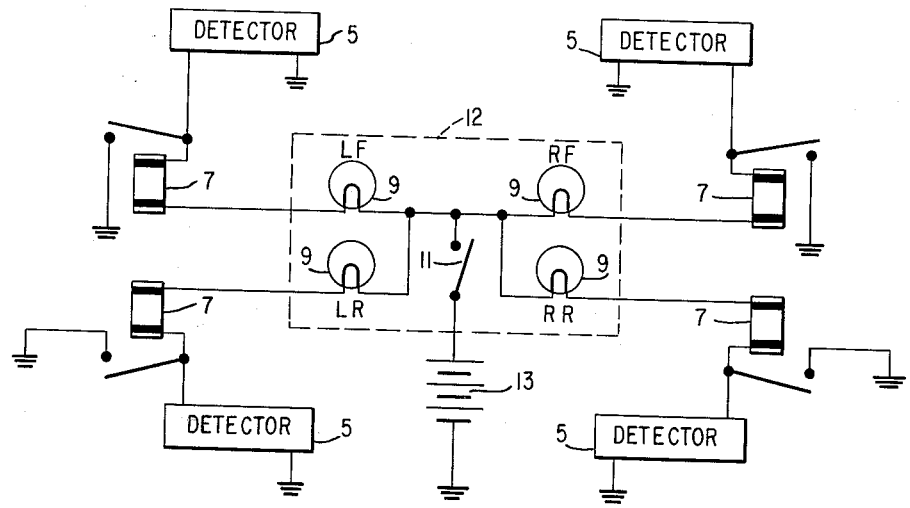
FIGURE 2 is a circuit diagram of the invention.

Broadly stated, the present invention comprises the discovery that the various tires of an automotive vehicle can be tested for metal if a plurality of detecting means are provided that are mounted on the vehicle one adjacent each of a plurality of the tires, in combination with indicator means individual to each detecting means and each indicator means being individually responsive to its associated detecting means to indicate both the presence of metal in its associated tire and the location of its associated tire, all the indicator means being visible from the operator's station. In its preferred form, the detecting means comprises a magnet movable under the attraction of metal in its associated tire to close the circuit of its associated indicator means. Also, it is preferred that a holding relay be provided in each indicator circuit so that the signal provided by momentary actuation of the indicator can be preserved. It is also preferred that the detectors be mounted for individual adjustive movement toward and away from the associated tire face and be lockable in any of a plurality of adjusted positions, and it is still further preferable that the detecting means be mounted for swinging movement about an axis parallel to the axis of the tire. It is also preferred that the indicator circuit be operated from the vehicle battery and that a switch in a portion of the circuit common to all the indicators activate or deactivate the apparatus. Finally, it is preferred that the switch and all the indicator means be closely adjacent each other at the operator's station.

Referring now to the drawings in greater detail, there is shown an automobile 1 of conventional construction, provided with four pneumatic tires 3. The automobile has the usual operator's station or driver's seat and the usual dashboard visible from the operator's station.

Mounted on the vehicle immediately in front of each tire 3 is a detector 5 for detecting the presence of ferrous metal in the face or tread of the tire 3. For this purpose, each detector 5 is about level with the axis of the wheel and is spaced a very short distance such as about ¼" away from and in front of the tire tread or face and is roughly laterally coextensive with the tire face. Each detector 5 is in electrical circuit with one of four grounded holding relays 7, each of which in turn is in electrical circuit with one of four signal lights 9, one individual to each of the tires 3. The lights 9 are grouped with a control switch 11 on a panel 12 on the dashboard of the car, and panel 12 is visible to the driver from the operator's station. The entire assembly of detectors 5 and the associated relays 7 and indicators comprising signal lights 9 is actuated by current from the grounded automobile battery 13.

Figure 3:
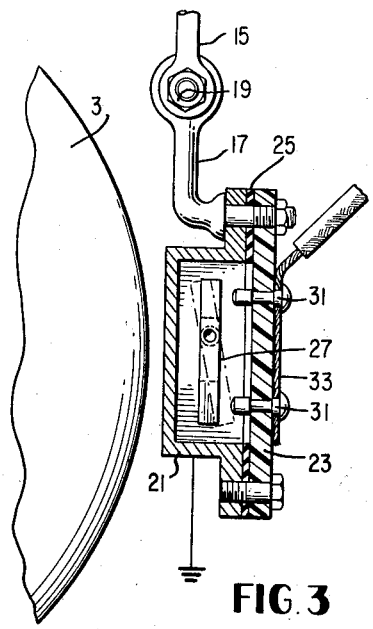
FIGURE 3 is a side elevational view, with parts in section, showing the detector of the invention.
Figure 4:
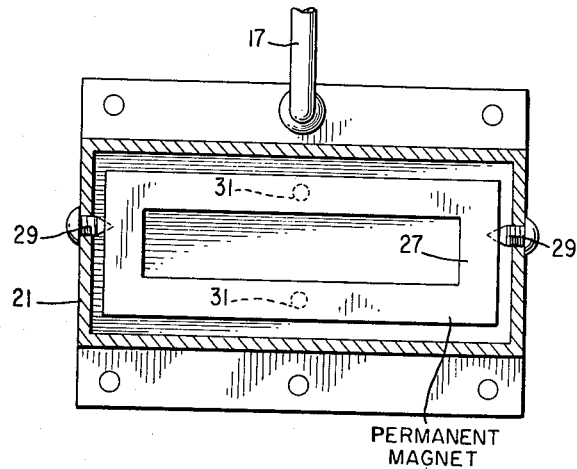
FIGURE 4 is a rear view of the detector of FIGURE 3 with the cover section removed, the better to show the parts.

In still greater detail, and with reference more particularly to FIGURES 3 and 4, the detectors of the present invention comprise a bracket 15 mounted on a forward under-portion of the wheel hood, each bracket 15 having a downwardly depending arm that is pivotally interconnected with an upwardly extending arm 17, the bracket 15 and the arm 17 being releasably locked in any of a plurality of positions of adjustment by means of a lock nut 19 of which the axis comprises the axis of swinging movement of detector 5 and is parallel to the axis of the associated wheel 3.

Arm 17 carries a grounded housing 21 which may for example be of cast aluminum or other electrically conductive material, the forward side of which is open but is closed by a plastic closure plate 23 bolted thereto. A gasket 25 seals between housing 21 and closure plate 23. Closure plate 23 may for example be of polymethyl methacrylate or other electrically insulating material, while gasket 25 may for example be of rubber.

A permanent magnet 27 in the shape of an open rectangle with its length horizontal is mounted for vertical swinging movement on two horizontally aligned bearings 29 that extend through the side walls of and into the interior of housing 21. Bearings 29 swingably support magnet 27 a little above the center of gravity of magnet 27, so that magnet 27 tends to move by gravity toward the full line position of FIGURE 3, in which its center of gravity is disposed in the same vertical plane as the common axis of bearings 29.

Two vertically spaced contacts 31 extend through plastic closure plate 23 and are electrically insulated by closure plate 23 from housing 21. A conductor in the form of a wire 33 electrically connects both contacts 31 and the associated holding relay 7.

In operation, switch 11 is closed and the vehicle is driven forward or backward slowly until the wheels have completed a full revolution. Should there be a piece of ferrous metal in the tire face of a given tire, the permanent magnet 27 will be attracted and will swing until its upper or lower edge portion contacts a contact 31. Such contact establishes the circuit from battery 13 through closed switch 11, through the associated signal light 9 and the holding relay 7, through wire 33 and contact 31 and magnet 27 and bearings 29 and housing 21 to ground. The associated signal light 9 on panel 12 is thus lit, and as each of the signal lights on panel 12 is identified as to its associated tire, for example, left front, right front, left rear and right rear, the operator can readily determine in which tire the undesired metal is located.

Actuation of the indicator also actuates the holding relay 7, so that when the piece of metal in a tire moves away from magnet 27 and magnet 27 resumes its vertical position shown in full line in FIGURE 3, the circuit to the associated signal light 9 will remain closed and signal light 9 will remain lit. The operator can thus move the vehicle through a full revolution of the tires without having to keep careful watch on panel 12 for momentary lighting of the signal light, since any actuated signal lights remain lit as long as switch 11 is closed. The operator can then take note of which tire contains undesired metal, after which the entire circuit can be deactivated by opening switch 11, inasmuch as switch 11 is common to all the indicators.

It is also to be noted that magnet 27 will swing one way or the other depending on which way the tire 3 rotates relative to detector 5. For example, magnet 27 will turn as shown in dotted lines in FIGURE 3 when tire 3 moves clockwise in FIGURE 3, because metal will first attract the upper portion of the magnet. If the tire 3 turns in the opposite direction, however, then the lower portion of magnet 27 will swing toward it and the upper portion of magnet 27 will complete contact with the upper contact 31. This is to say, therefore, that the vehicle can be driven in either direction in order to test for metal in the tires.

It should also be noted that detectors 5 are adjustable as close to or as far from tires 3 as desired, simply by loosening nut 19, swinging detector 5 to the desired position, and again tightening nut 19.

From a consideration of the foregoing disclosure, therefore, it will be obvious that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the invention as defined by the appended claims.

What is claimed is:

1. An automotive vehicle having an operator's station and a plurality of pneumatic tires, the combination comprising:
    (a) a plurality of detector means mounted on the vehicle adjacent each of a plurality of the tires for generating an electrical impulse on passing in proximity to a foreign metallic body embedded in the associated tire,
    (b) indicator means for each detector means actuated by an electrical impulse from the associated detector means,
    (c) support means holding the plurality of indicator means adjacent to each other and in a location where the indicating means are visible from the operator's station,
    (d) electrical conduit means connecting each detector means with the associated indicator means for transmitting an actuating impulse from the detector means to the indicator means,
    (e) a source of electrical energy,
    (f) means connecting the source of electrical energy with the plurality of indicator means and the plurality of detector means to form an electrical circuit for supplying the electrical energy of the electrical impulses, and
    (g) manually operable switch means in the electrical circuit for opening and closing the electrical circuit.

2. An automotive vehicle having an operator's station and a plurality of pneumatic tires, the combination comprising:
    (a) a plurality of detector means mounted on the vehicle adjacent each of a plurality of the tires for generating an electrical impulse on passing in proximity to a foreign metallic body embedded in the associated tire,
    (b) indicator means for each detector means actuated by an electrical impulse from the associated detector means,
    (c) support means holding the plurality of indicator means adjacent to each other and in a location where the indicating means are visible from the operator's station,
    (d) electrical conduit means connecting each detector means with the associated indicator means for transmitting an actuating impulse from the detector means to the indicator means,
    (e) a source of electrical energy,
    (f) means connecting the source of electrical energy with the plurality of indicator means and the plurality of detector means to form an electrical circuit for supplying the electrical energy of the electrical impulses,
    (g) a common electrical connection between the source of electrical energy and the associated side of the electrical circuit forming part of the electrical conduit means, and
    (h) a manually operable switch in the common electrical connection for opening and closing the common electrical connection.

3. An automotive vehicle having an operator's station and a plurality of pneumatic tires, the combination comprising:
    (a) a plurality of detector means mounted on the vehicle adjacent each of a plurality of the tires for generating an electrical impulse on passing in proximity to a foreign metallic body embedded in the associated tire,
    (b) indicator means for each detector means actuated by an electrical impulse from the associated detector means,
    (c) support means holding the plurality of indicator means adjacent to each other and in a location where the indicating means are visible from the operator's station,
    (d) electrical conduit means connecting each detector means with the associated indicator means for transmitting an actuating impulse from the detector means to the indicator means,
    (e) a source of electrical energy, (f) means connecting the source of electrical energy with the plurality of indicator means and the plurality of detector means to form an electrical circuit for supplying the electrical energy of the electrical impulses, and (g) holding circuit means including the source of electrical energy associated with each of a plurality of the electrical conduit means for establishing a continuous electrical current through the associated indicator means when the holding means is energized by an impulse from the associated detector means.

References Cited by the Examiner

UNITED STATES PATENTS 2,788,484   4/57   Deming _____ 200—61.09 XR

NEIL C. READ, *Primary Examiner.*